(12) United States Patent
Mahendra et al.

(10) Patent No.: US 12,441,643 B2
(45) Date of Patent: Oct. 14, 2025

(54) ANAEROBIC-AEROBIC BIOREMEDIATION OF CONTAMINATED WATER

(71) Applicant: THE REGENTS OF THE UNIVERSITY OF CALIFORNIA, Oakland, CA (US)

(72) Inventors: Shaily Mahendra, Santa Monica, CA (US); Alexandra Polasko, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 497 days.

(21) Appl. No.: 16/766,582

(22) PCT Filed: Nov. 21, 2018

(86) PCT No.: PCT/US2018/062215
§ 371 (c)(1),
(2) Date: May 22, 2020

(87) PCT Pub. No.: WO2019/104144
PCT Pub. Date: May 31, 2019

(65) Prior Publication Data
US 2020/0369546 A1    Nov. 26, 2020

Related U.S. Application Data

(60) Provisional application No. 62/590,030, filed on Nov. 22, 2017.

(51) Int. Cl.
*C02F 3/34* (2023.01)
*B09C 1/00* (2006.01)
(Continued)

(52) U.S. Cl.
CPC .............. *C02F 3/341* (2013.01); *B09C 1/002* (2013.01); *C02F 3/30* (2013.01); *C12N 1/20* (2013.01);
(Continued)

(58) Field of Classification Search
CPC ... B09C 1/10; B09C 1/002; B09C 1/00; C02F 3/34; C02F 2103/06; C02F 3/341; C02F 2101/322; C02F 2101/36; C12N 1/20
(Continued)

(56) References Cited

U.S. PATENT DOCUMENTS 6,884,351 B1   4/2005   Lytal
2004/0043474 A1   3/2004   Newman
(Continued)

FOREIGN PATENT DOCUMENTS

EP    0569199 A1 *  11/1993    ............... C02F 3/30

OTHER PUBLICATIONS

International Search Report and Written Opinion issued in Corresponding PCT Application No. PCT/US2018/062215, dated Feb. 5, 2019.
(Continued)

*Primary Examiner* — Claire A Norris
(74) *Attorney, Agent, or Firm* — Norton Rose Fulbright US LLP

(57) ABSTRACT

Methods and co-cultures for biodegrading contaminants are described. A method can include contacting a contaminated substance with a microbial mixture under anaerobic conditions and causing degradation of contaminants by metabolism of the microbes in the microbial mixture. The co-culture can include aerobic microbes like *Pseudonocardia* and related genera along with anaerobic microbes of *Dehalococcoides* and related genera.

18 Claims, 9 Drawing Sheets

(51) Int. Cl.
| | |
|---|---|
| *B09C 1/10* | (2006.01) |
| *C02F 3/30* | (2023.01) |
| *C12N 1/20* | (2006.01) |
| *C02F 101/32* | (2006.01) |
| *C02F 101/34* | (2006.01) |
| *C02F 101/36* | (2006.01) |
| *C02F 103/00* | (2006.01) |
| *C02F 103/06* | (2006.01) |

(52) U.S. Cl.
CPC .......... *B09C 1/10* (2013.01); *C02F 2101/322* (2013.01); *C02F 2101/34* (2013.01); *C02F 2101/36* (2013.01); *C02F 2103/007* (2013.01); *C02F 2103/06* (2013.01)

(58) Field of Classification Search
USPC ................................ 210/170.04, 747.7, 630
See application file for complete search history.

(56) References Cited

U.S. PATENT DOCUMENTS

| | | | | |
|---|---|---|---|---|
| 2013/0105387 | A1* | 5/2013 | Antoinette | C02F 3/327 210/602 |
| 2013/0337518 | A1 | 12/2013 | Razavi-Shirazi et al. | |
| 2014/0083934 | A1* | 3/2014 | Brown | C02F 3/12 210/605 |
| 2016/0369261 | A1* | 12/2016 | Razavi-Shirazi | C02F 3/308 |
| 2018/0135141 | A1* | 5/2018 | Yamamoto | A62D 3/02 |

OTHER PUBLICATIONS

Mahendra et al., "Identification of the Intermediates of in Vivo Oxidation of 1,4-Dioxane by Monooxygenase-Containing Bacteria" Environ. Sci. Technol. 2007, 41(21), 7330-7336.
Mahendra et al., "The impact of chlorinated solvent co-contaminants on the biodegradation kinetics of 1,4-dioxane" Chemosphere 2013, 91(1), 88-92.
Shukla et al., "Current trends in trichloroethylene biodegradation: a review" *Critical Reviews in Biotechnology* 2014, 34(2), 101-114.
Zhang et al., "Advances in bioremediation of 1,4-dioxane-contaminated waters" *Journal of Environmental Management* 2017, 204(2), 765-774.
Alvarez- Zaldivar P et al. "Biogeochemical modelling of in situ biodegradation and stable isotope fractionation of intermediate chloroethenes in a horizontal subsurface flow wetland." *Ecological Engineering*, vol. 90, Feb. 13, 2016.
Dalton, Olmsted & Fuglevand. "Technical Memorandum: ISB Phase I and ISCO Phase II Results and Downgradient Area Pilot Study WorkPlan." *Georgetown Facility*, Seattle, WA, Nov. 17, 2016, pp. 1-87.
Dolinova Iva et al. "Microbial degradation of chloroethenes: a review." *Environ Sci Pollut Re*, vol. 24, No. 15, Apr. 5, 2017, pp. 13262-13283.
Guiot, Serge R. et al. "Electrolytic Methanogenic-Methanotrophic Coupling for Tetrachloroethylene Bioremediation: Proof of Concept." *Environmental Science & Technology*, vol. 42, No. 8, Mar. 18, 2008, pp. 3011-3017.
Neilson, Julia W. et al. "Life at the hyperarid margin: novel bacterial diversity in arid soils of the Atacama Desert, Chile." *Extremophiles: Springer*, vol. 16, No. 3, Apr. 18, 2012, pp. 553-566.
Polasko Alexandra L et al. "A Mixed Microbial Community for the Biodegradation of Chlorinated Ethenes and 1,4-Dioxane." *Environmental Science & Technology Letters*, vol. 6, No. 1, Dec. 6, 2018, pp. 49-54.
Supplementary Search Report and Written Opinion issued in corresponding European Patent Application No. 18880734.1, dated Dec. 15, 2021.
Tartakovsky B. et al. "Trichloroethylene Degradation in a Coupled Anaerobic/ Aerobic Reactor Oxygenated Using Hydrogen Peroxide". *Environmental Science & Technology*, vol. 37, No. 24, Dec. 1, 2003, pp. 5823-5828.
Magnuson, J. et al., "Trichloroethene Reductive Dehalogenase from Dehalococcoides ethenogenes: Sequence of tceA Substrate Range Characterization", *Applied and Environmental Microbiology*, 66(12); pp. 5141-5147, 2000.
Office Action issued in corresponding European Application No. 18880734.1, dated Jan. 25, 2024.
Polasko, A.L., "Sequential Anaerobic-Aerobic Biodegradation of Trichloroethylene and 1,4-Dioxane", *Theses: UCLA Electronic Theses and Dissertations*, 35 pages, 2017.

* cited by examiner

ANAEROBIC-AEROBIC BIOREMEDIATION OF CONTAMINATED WATER

CROSS REFERENCE TO RELATED APPLICATIONS

This application is a national phase application under 35 U.S.C. § 371 of International Application No. PCT/US2018/062215, filed Nov. 21, 2018, which claims priority to and the benefit of U.S. Provisional Application No. 62/590,030, filed Nov. 22, 2017, the contents of which is incorporated into the present application in its entirety.

U.S. GOVERNMENT SPONSORED SUPPORT STATEMENT

This invention was made with Government support under Grant No. W912HQ-17-C-0009 awarded by the U.S. Department of Defense. The government has certain rights in the invention.

BACKGROUND OF THE INVENTION

A. Field of the Invention

The invention generally concerns the co-metabolic or sequential anaerobic-aerobic bioremediation of contaminated water using aerobic microbes that can withstand incubation in anaerobic conditions and a mixture of anaerobic and aerobic microbes.

B. Description of Related Art

Storage and disposal of halogenated volatile organic compounds (HVOCs) and compounds that stabilize HVOCs (e.g., trichloroethylene (TCE) and 1,4-dioxane) underground has led to widespread groundwater contamination. Through releases of solvents, degreasers and other compounds, chlorinated compound contamination in surface and subsurface environments has reached high levels, and in many areas has seriously jeopardized drinking water aquifers and reservoirs. By way of examples, sites contaminated with 1,4-dioxane are usually found near sites contaminated with TCE. Biological remediation can be an effective technology for breaking down these co-contaminants in groundwater (See, for example, Zhang et al. *Journal of Environmental Management*, 2017, 204:765-774 and McCarty *Current Opinion in Biotechnology*, 1993, 4(3):323 -30). However, the success of bioremediation can depend on the geochemical properties of the subsurface. Many of the current technologies for 1,4-dioxane and TCE groundwater remediation rely on expensive pump-and-treat methods or require multiple well injections. By way of example, the reductive and oxidative (redox) conditions in the groundwater contaminant plumes can limit degradation or natural attenuation.

Attempts to remediate groundwater contaminated with HVOC's can include anaerobic microbes, while remediation of dioxane contaminated groundwater usually requires aerobic microbes. For example, the dechlorinating bacteria genus *Dehalococcoides* can degrade chlorinated ethenes via reductive dechlorination. This stepwise process involves the transfer of an electron from hydrogen to the chlorinated compound and results in the substitution of a chlorine atom with a hydrogen atom. Reductive dechlorination occurs most optimally under strict anaerobic conditions. However, a potential challenge to this process is the formation and accumulation of intermediate daughter products, such as cis-1,2-dichloroethene (cDCE) and vinyl chloride (a human carcinogen) in anaerobic groundwater (See, for example, Vogel, et al., *Applied and Environmental Microbiology*, 1985, 49(5):1080-83). Aerobic biodegradation of less chlorinated ethenes (e.g., dichlorinated ethylene) can occur cometabolically. The microorganisms can utilize their oxygenase enzymes to biodegrade the primary substrate, which can also transform TCE to a chlorinated epoxide and then to $H_2O$, $Cl^-$, $CO_2$ and $H^+$. Although aerobic cometabolic remediation of HVOCs may be useful for plumes under oxidizing conditions, it can suffer without additional amendments (e.g., air, oxygen, nutrients, etc.) required by microbial cometabolic populations.

Aerobic degradation of 1,4-dioxane has been performed in the absence of volatile chlorinated organic compounds (See, for example, Mahendra et al., *Environmental Science & Technology*, 2007, 41(21):7330-36). 1,4-Dioxane is only reported to biodegrade aerobically, however, and anaerobic microbes have not yet been isolated that are capable of biodegrading 1,4-dioxane. Conflicting redox conditions favored by bacteria that degrade chlorinated hydrocarbons and those that degrade 1,4-dioxane pose a challenging problem for concurrent bioremediation of both types of contaminants.

SUMMARY OF THE INVENTION

A discovery has been made that provides a solution for remediation of substances contaminated with halogenated volatile organic compounds (HVOCs) and their stabilizers (HVOC stabilizing compounds). The solution is premised on the use of aerobic microorganisms that can degrade contaminants under aerobic conditions and that can also withstand incubation in an anaerobic environment for a substantial period of time before degrading the contaminants. These aerobic microorganisms are suitable for use in co-culture or co-metabolism of HVOC-degrading anaerobic microorganisms and HVOC stabilizer-degrading aerobic microorganisms that can concurrently (either sequentially or simultaneously) biodegrade both types of contaminants. In some embodiments, HVOC stabilizer-degrading aerobic microorganisms disclosed herein are also capable of degrading some HVOCs. For example, *Pseudonocardia* and related bacteria, including *Pseudonocardia dioxanivorans* CB1190, can degrade both the HVOC cDCE and the HVOC stabilizer 1,4-dioxane. The co-culture can include an engineered microbial community composed of one or more anaerobic microorganisms (e.g., KB-1®, SiREM, Canada, and the like) and one or more aerobic microorganisms (e.g., *Pseudonocardia dioxanivorans* CB1190 (CB9110) (ATCC Accession No. 55486, DSMZ Accession No. 44775), and the like) in modified medium to simultaneously or sequentially degrade HVOCs and HVOC stabilizers. Thus, the co-culture provides an elegant, economical, and more effective remediation alternative to conventional remediation.

In one embodiment, a method for bioremediation of a contaminated substance (e.g., surface soil, subsurface soil, contaminated water, contaminated ground water, or contaminated groundwater containing a contaminant plume or combinations thereof) is described. The substance can be contaminated with a HVOC compound and a HVOC stabilizing compound. The method can include contacting the contaminated substance with a microbial mixture that includes stabilizer-degrading aerobic microorganisms and HVOC-degrading anaerobic microorganisms in an amount sufficient to lower the concentration of the contaminating HVOC compound and HVOC stabilizer in the contaminated substance. In some embodiments the concentration of a HVOC compound, a HVOC stabilizer, or both is reduced by at least 10, 20, 30, 40, 50, 60, 70, 80, 90, 95, 99, or 99.9% within 48 hours of contacting the contaminated substance with the microbial mixture, or between any two of these values. In some embodiments, the concentration is reduced by at least 10, 20, 30, 40, 50, 60, 70, 80, 90, 95, 99, or 99.9%, or any range derivable therein, within 24, 72, 96, 120, 144, or 168 hours of contacting the contaminated substance with the microbial mixture. The contaminated substance can be a surface and/or subsurface soil. The microbial mixture can include HVOC stabilizer-degrading aerobic microorganisms such as *Pseudonocardia dioxanivorans* CB1190 (CB1190) and/or HVOC-degrading anaerobic microorganisms such as *Dehalococcoides*. In some embodiments, the HVOC stabilizer-degrading aerobic microorganisms include *Mycobacterium, Rhodococcus, Nocardioides, Methylosinus, Methylococcus, Methylobacterium, Polaromonas*, or *Pseudonocardia* bacteria. In some embodiments, the HVOC-degrading anaerobic microorganisms include *Desulfitobacterium, Dehalobacter, Dehalogenimonas, Dehalospirillum, Desulfuromonas, Geobacter, Clostridium, Enterobacter*, or *Dehalococcoides* bacteria. In certain embodiments, the HVOC stabilizer is a cyclic ether, for example, 1,4-dioxane. The HVOC compound can include a halogenated olefin (e.g., chlorinated ethenes), a halogenated methane, a halogenated ethane, a halogenated propane, or mixtures thereof. In a particular embodiment, the HVOC compound can be trichloroethylene (TCE), dichloroethylene (e.g., cis- dichloroethylene (cDCE)), vinyl chloride, or combinations thereof. The cDCE and vinyl chloride can be degradation products of TCE, which are then further degraded. Such further degradation may be accomplished by the HVOC stabilizer-degrading aerobic microorganism. The microbial mixture can include a ratio of HVOC stabilizer-degrading aerobic microorganisms to HVOC-degrading anaerobic microorganisms at a weight ratio of $1:10^{12}$, $1:10^{11}$, $1:10^{10}$, $1:10^{9}$, $1:10^{8}$, $1:10^{7}$, $1:10^{6}$, $1:10^{5}$, $1:10^{4}$, 1:1000, 1:100, 1:75; 1:50, 1:25, 1:20, 1:10, 1:1, 10:1, 20:1, 25:1, 50:1, 75:1 100:1, 1000:1, $10^{4}:1$, $10^{5}:1$, $10^{6}:1$, $10^{7}:1$, $10^{8}:1$, $10^{9}:1$, $10^{10}:1$, $10^{11}:1$, or $10^{12}:1$, including all values and ranges there between. In some embodiments, the stabilizer contaminants can be degraded at a rate of at least 100, 150, 200, 250, 300, 350, 400, 450, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 μg/L/day, or any range derivable therein, and the HVOC contaminants can degraded at a rate of at least 10, 20, 30, 40, 50, 60, 70, 80, 90, 100, 110, 120, 130, 140, 150, 160, 170, 180, 190, 200, 210, 220, 230, 240, 250, 275, 300, 325, 350, 375, 400, or 425 μg/L/day, or any range derivable therein. As exemplified in the examples, an HVOC stabilizer-degrading aerobic microorganism, e.g., CB1190, was able to survive anaerobic incubation and reactivate the monooxygenase enzyme necessary for degradation of 1,4-dioxane. In addition, after 48 hours of anaerobic incubation, a co-culture of stabilizer-degrading aerobic microorganisms and HVOC-degrading anaerobic microorganisms (e.g., CB1190+KB-1®) can biodegrade high concentrations of stabilizers (e.g., 1,4-dioxane) at a rate of 3,868±187 μg/L/day and the by-product, cis-dichloroethylene (cDCE), at 423±94 μg/L/day. At lower concentrations of HVOC stabilizing compounds, HVOC stabilizer-degrading anaerobic microorganisms and HVOC-degrading aerobic microorganisms can degrade the HVOC stabilizing compound at a rate of 630±20 μg/L/day and the by-product, cDCE, at a rate of 260±90 μg/L/day. In some embodiments, the method can include injecting the microbial mixture into or onto a contaminated substance.

In yet another embodiment, a microbial mixture (e.g., a co-culture) is described. The microbial mixture may be redox stable. The microbial mixture can include a HVOC-degrading anaerobic microorganism and a HVOC stabilizer-degrading aerobic microorganism. The HVOC-degrading anaerobic microorganisms can be a microorganism consortium, and, in some instances, include *Dehalococcoides sp.* The HVOC stabilizer-degrading aerobic microorganism can be *Pseudonocardia dioxanivorans* CB1190 (CB1190) or any aerobic bacteria. In some embodiments, the HVOC stabilizer-degrading aerobic microorganisms include *Mycobacterium, Rhodococcus, Nocardioides, Methylosinus, Methylococcus, Methylobacterium, Polaromonas*, or *Pseudonocardia* bacteria. In some embodiments, the HVOC-degrading anaerobic microorganisms include *Desulfitobacterium, Dehalobacter, Dehalogenimonas, Dehalospirillum, Desulfuromonas, Geobacter, Clostridium, Enterobacter*, or *Dehalococcoides* bacteria. In some embodiments, the mixture contains 1, 2, 3, 4, 5, 6, 7, 8, 9, 10, 11, 12, 13, 14, 15, 16, 17, 18, 19, or 20 different bacterial species. Any combinations of HVOC-degrading anaerobic bacteria and HVOC stabilizer-degrading aerobic bacteria disclosed herein can be combined in the mixture. In some embodiments, the mixture includes 1, 2, 3, 4, 5, 6, 7, or 8 of any of the HVOC stabilizer-degrading aerobic microorganisms disclosed herein and 1, 2, 3, 4, 5, 6, 7, 8, or 9 of any of the HVOC-degrading anaerobic microorganisms disclosed herein. In some instances, a weight ratio of HVOC stabilizer-degrading aerobic microorganisms to HVOC-degrading anaerobic microorganisms can be $1:10^{12}$, $1:10^{11}$, $1:10^{10}$, $1:10^{9}$, $1:10^{8}$, $1:10^{7}$, $1:10^{6}$, $1:10^{5}$, $1:10^{4}$, 1:1000, 1:100, 1:75; 1:50, 1:25, 1:20, 1:10, 1:1, 10:1, 20:1, 25:1, 50:1, 75:1 100:1, 1000:1, $10^{4}:1$, $10^{5}:1$, $10^{6}:1$, $10^{7}:1$, $10^{8}:1$, $10^{9}:1$, $10^{10}:1$, $10^{11}:1$, $10^{12}:1$, or between any two of these values. These ratios can also be used in any of the methods in which a mixture of HVOC stabilizer-degrading aerobic microorganism and HVOC-degrading anaerobic microorganism is used, as can any of the bacterial mixtures described herein. The HVOC-degrading anaerobic microorganisms can degrade a halogenated olefin (e.g., chlorinated ethenes), a halogenated methane, a halogenated ethane, a halogenated propane, or mixtures thereof, and the HVOC stabilizer-degrading aerobic microorganisms can degrade dioxane and/or any other solvent stabilizing organic compound. The microbial mixtures disclosed herein can be comprised in a composition comprising contaminants such as one or more of the HVOCs and/or HVOC stabilizers disclosed herein. In some embodiments, the HVOC in the composition is a halogenated olefin, a halogenated methane, a halogenated ethane, a halogenated propane, a halogenated benzene, or mixtures thereof. In some embodiments, the HVOC is trichloroethylene, dichloroethylene, or vinyl chloride. In some embodiments, the HVOC stabilizer present in the composition is an organic compound comprising a heteroatom, preferably dioxane. In some embodiments, the mixture is comprised in an anaerobic aqueous environment. As used herein, "anaerobic" refers to conditions in which there is less than 0.5 mg of dissolved $O_2$ gas per liter of liquid. In some embodiments, the mixture is comprised in a composition that has a dissolved $O_2$ concentration of less than about 0.5, 0.4, 0.3, 0.2, 0.1, 0.01, or 0.001 mg/L, or between any two of these values.

Also disclosed is a method for bioremediation of a contaminated substance, the method comprising contacting the contaminated substance with an effective amount of a HVOC stabilizer-degrading aerobic microorganism under anaerobic conditions and degrading one or more contaminants comprised in the contaminated substance by metabolism of the HVOC stabilizer-degrading aerobic microorganism after a transition to aerobic conditions. The inventors have surprisingly discovered that some HVOC stabilizer-degrading aerobic microorganisms can withstand incubation in anaerobic conditions for an extended period of time and, after transitioning to aerobic conditions, can grow and metabolize HVOC stabilizers and some HVOCs. In particular embodiments, the HVOC stabilizer-degrading aerobic microorganism is a *Pseudonocardia* bacterium, for example *Pseudonocardia dioxanivorans* CB1190. In some embodiments, the method further comprises contacting the contaminated substance with an effective amount of an HVOC-degrading anaerobic microorganism before the transition to aerobic conditions. The HVOC-degrading anaerobic microorganism can be added before, after, or at the same time as the HVOC stabilizer-degrading aerobic microorganism, or may be added as part of a mixture with a HVOC stabilizer-degrading aerobic microorganism. Any of the mixtures described herein may be used in the method. The HVOC stabilizer-degrading aerobic microorganism may be capable of degrading one or more contaminants, including a first HVOC, an HVOC stabilizer, or both a first HVOC and an HVOC stabilizer. The HVOC stabilizer-degrading aerobic microorganism may also be incapable of degrading a second HVOC, which the HVOC-degrading anaerobic microorganism is capable of degrading. For example, the HVOC stabilizer-degrading aerobic microorganism may be capable of degrading cDCE (a first HVOC) and 1,4-dioxane (an HVOC stabilizer), but be incapable of degrading TCE (a second HVOC), while the HVOC-degrading anaerobic microorganism is capable of degrading TCE. In some embodiments, the first HVOC is a product of the degradation of the second HVOC by the HVOC-degrading anaerobic microorganism, as is the case with cDCE, which is a product of degradation of TCE by an HVOC-degrading anaerobic microorganism.

One embodiment that illustrates how an HVOC stabilizer-degrading aerobic microorganism and an HVOC-degrading anaerobic microorganism can work together to remediate a contaminated substance is as follows: the HVOC-degrading anaerobic microorganism can degrade TCE, an HVOC when conditions are anaerobic, and only in those conditions. A product of the TCE degradation is cDCE (another HVOC), which can be degraded by an HVOC stabilizer-degrading aerobic microorganism, but only under aerobic conditions. The HVOC stabilizer-degrading aerobic microorganism can also degrade an HVOC stabilizer like 1,4-dioxane. Therefore, after transition to aerobic conditions, the HVOC stabilizer-degrading aerobic microorganism can take over the degradation that was started by the HVOC-degrading anaerobic microorganism. There may be a transition period during which both types of bacteria are active for a time, but the HVOC-degrading anaerobic microorganism typically dies in an aerobic environment, which has the benefit of preventing this bacteria from making harmful byproducts via its continued metabolism.

The transition to an aerobic environment from an anaerobic environment may be accomplished in a variety of ways. For example, culture conditions may be changed such that a culture container that initially has a headspace filled with $N_2$ is transitioned to having a headspace filled with atmospheric air or oxygen at a defined concentration. The transition from an anaerobic to an aerobic environment may happen due to changing conditions in an underground formation, for example. Aerobic microbes may temporarily be subjected to anaerobic conditions due to their location within a geological formation or due to their location in a wastewater treatment plant or process. A change in location of the aerobic microbes may then result in their being in a relatively oxygen-rich, aerobic environment. In some embodiments, before the transition to aerobic conditions, the concentration of dissolved oxygen in the contaminated substance is less than about 0.5, 0.4, 0.3, 0.2, 0.1, or 0.01 mg/L. In some embodiments, the transition to aerobic conditions takes place at least 2, 4, 8, 12, 16, 20, 24, 28, 32, 36, 40, 44, 48, 50, or 60 hours after contacting the contaminated substance with the HVOC stabilizer-degrading aerobic microorganism, or any range derivable therein. Despite the relatively long incubation in anaerobic conditions, the HVOC stabilizer-degrading microorganism is capable of commencing or recommencing growth and metabolism, including degradation of certain HVOC stabilizers and HVOCs, after transition to aerobic conditions.

In some embodiments, the HVOC-degrading anaerobic microorganism accomplishes substantial degradation of an HVOC before the transition to aerobic conditions. In some embodiments, at least 60, 65, 70, 75, 80, 85, 90, 95, 99, or 99.9% of the second HVOC is degraded before the transition to aerobic conditions. In some embodiments, the HVOC stabilizer-degrading aerobic bacteria degrades the first HVOC at a rate of at least 200 µg/L/day. In some embodiments, the HVOC stabilizer-degrading aerobic bacteria degrades the HVOC stabilizer is degraded at a rate of at least 2,000 µg/L/day. In some embodiments, the concentration of the first HVOC is reduced by at least 1.5, 2, 3, 4, 5 or 10-fold within 72 hours of the transition to aerobic conditions, or between any two of these values. In some embodiments, the concentration of the first HVOC is reduced by at least 10, 20, 30, 40, 50, 60, 70, 80, 90, 95, 99, or 99.99% within 72 hours of the transition to aerobic conditions, or between any two of these values. In some embodiments, the concentration of the HVOC stabilizer is reduced by at least 1.5, 2, 3, 4, 5, or 10-fold within 72 hours of the transition to aerobic conditions, or between any two of these values. In some embodiments, the concentration of the HVOC stabilizer is reduced by at least 10, 20, 30, 40, 50, 60, 70, 80, 90, 95, 99, or 99.99% within 72 hours of the transition to aerobic conditions, or between any two of these values. In some embodiments, the HVOC stabilizer-degrading aerobic microorganism increases in biomass by at least 2, 3, 4, 5, 6, 7, 8, 9, 10, 15, or 20-fold within 5 days of the transition to aerobic conditions.

In some embodiments, the initial concentrations of the microorganisms when they are brought into contact with the contaminated substance can range from about 100 to $10^7$ cells/ml. In some embodiments, contacting the contaminated substance with an effective amount of the HVOC stabilizer-degrading aerobic microorganism causes the concentration of the HVOC stabilizer-degrading aerobic microorganism in the contaminated substance to be at least about, at most about, or about 100, 1000, $10^4$, $10^5$, $10^6$, and $10^7$ cells/ml, or between any two of these values. In some embodiments, contacting the contaminated substance with an effective amount of the HVOC-degrading anaerobic microorganism causes the concentration of the HVOC-degrading anaerobic microorganism in the contaminated substance to at least about, at most about, or about 100, 1000, $10^4$, $10^5$, $10^6$, and $10^7$ cells/ml, or between any two of these values.

Also disclosed is a method of biodegrading one or more compounds, the method comprising: adding an effective amount of a mixture of *Pseudonocardia* and *Dehalococcoides* bacteria to a composition that comprises TCE and is under anaerobic conditions; degrading the TCE to form cDCE by metabolism of the *Dehalococcoides* bacteria under anaerobic conditions; and degrading the cDCE by metabolism of the *Pseudonocardia* bacteria after the composition transitions to aerobic conditions. In some embodiments, the composition further comprises 1,4-dioxane. Any of the other microbes or microbial mixtures disclosed herein may be used in this method. In some embodiments, the method further comprises degrading the 1,4-dioxane by metabolism of the *Pseudonocardia* bacteria after the composition transitions to aerobic conditions. In some embodiments, before the transition to aerobic conditions, the concentration of dissolved oxygen in the composition is about or less than about 0.5, 0.4, 0.3, 0.2, 0.1, or 0.01 mg/L, or between any two of these values. In some embodiments, the concentration of dissolved oxygen in the composition after the transition to aerobic conditions is about or at least about 0.5, 0.6, 0.7, 0.8, 0.9, 1.0, 1.5, 2.0, 3.0, 4.0, 5.0, 6.0, 7.0, 8.0, 9.0, or 10.0 mg/L, or between any two of these values.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment discussed herein can be implemented with respect to any method or composition of the invention, and vice versa. Furthermore, compositions and kits of the invention can be used to achieve methods of the invention.

The following includes definitions of various terms and phrases used throughout this specification.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %", "vol. %", or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The microbe mixture and methods of use of the microbes of the present invention can "comprise," "consist essentially of," or "consist of" particular ingredients, components, compositions, etc. disclosed throughout the specification. With respect to the transitional phrase "consisting essentially of," in one non-limiting aspect, a basic and novel characteristic of the methods and microbe mixture of the present invention are their abilities to anaerobically and aerobically biodegrade mixtures of halogenated organic compounds and their stabilizers.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

Figure 1:
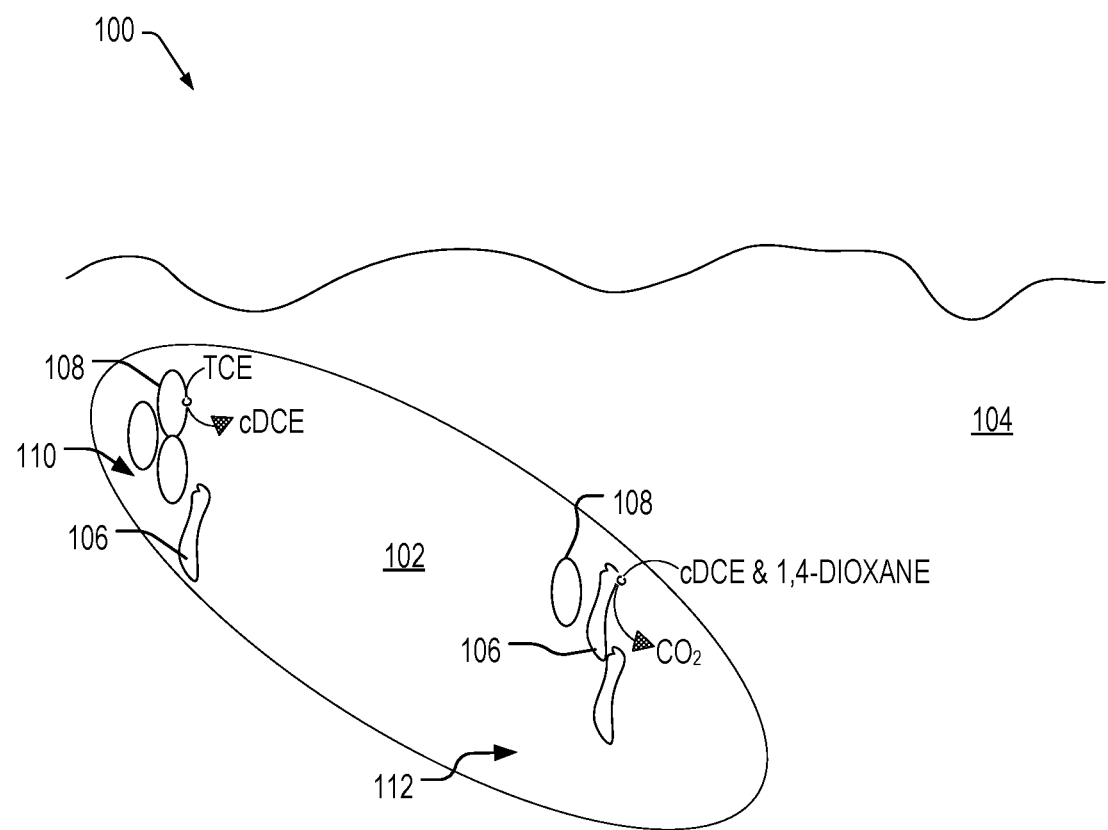
FIG. 1 is a schematic of a method to bioremediate a contaminated water source using a microbial mixture.

While the invention is susceptible to various modifications and alternative forms, specific embodiments thereof are shown by way of example in the drawings. The drawings may not be to scale.

DETAILED DESCRIPTION OF THE INVENTION

Remediation of co-occurring water contaminants, such as, trichloroethylene and 1,4-dioxane, can be challenging. They are both suspect carcinogens and are widespread throughout water aquifers. TCE can be biodegraded using anaerobic bacteria via reductive dechlorination and 1,4-dioxane can be broken down biologically using only aerobic bacteria beginning with hydroxylation. However, it can be difficult for users to prioritize one contaminant over another, and, until both contaminants are removed from the water, it remains unsafe to drink. A discovery has been found that provides a solution to substances (e.g., wastewater or groundwater) contaminated with halogenated organic compounds and their solvent stabilizers. The solution is premised on the use a co-culture of anaerobic and aerobic microbes that can concurrently (either sequentially or simultaneously) biodegrade both types of contaminants. Notably, the co-culture of the present invention can withstand changing redox conditions and biodegrade both HVOCs and HVOC stabilizers. Stabilizer-degrading aerobic microorganisms of the present invention (e.g., CB1190) can withstand anaerobic incubation and reactivate the monooxygenase enzymes necessary to biodegrade stabilizer compounds (e.g., 1,4-dioxane), HVOCs, and by products of HVOC degradation (e.g., TCE to cDCE and vinyl chloride). Notably, minimal amounts of HVOCs (e.g., chlorinated hydrocarbons) do not inhibit the aerobic microbes' ability to biodegrade the HVOC stabilizing compounds.

Non-limiting examples of a volatile organic compound contaminants can include halogenated aliphatics, halogenated aromatics and non-chlorinated aromatics. Specific halogenated volatile organic compounds can include methylene chloride, 1,1-dichloroethane, chloroform, 1,2-dichloropropane, dibromochloromethane, 1,1,2-trichloroethane, 2-chloroethylvinyl ether, tetrachloroethene (PCE), chlorobenzene, 1,2-dichloroethane, 1,1, 1-trichloroethane (methyl chloroform), bromodichloromethane, trans-1,3 -dichloropropene, cis-1,3-dichloropropene, bromoform, chloromethane, bromomethane, vinyl chloride, chloroethane, 1,1-dichloroethene, trans-1,2-dichloroethene, trichloroethene (TCE), dichlorobenzenes, cis-1,2-dichloroethene (cDCE), dibromomethane, 1,4-dichlorobutane, 1,2,3-trichloropropane, bromochloromethane, 2,2-dichloropropane, 1,2-dibromoethane, 1,3-dichloropropane, bromobenzene, chlorotoluenes, trichlorobenzenes, trimethylbenzenes, and trans-1,4-dichloro-2-butene. In a particular embodiment TCE, cDCE and vinyl chloride can be degraded in accordance with the present invention.

Stabilizers can include acylic and/or cyclic hydrocarbons that include at least one oxygen atom. Non-limiting examples of stabilizers include tetrahydrofuran (THF), dioxanes (e.g., 1,4-dioxane, 1,3-dioxane), 1,3-dioxolane, 1,3,5-trioxane, 1,2-butylene oxide, isoamyl alcohol, isobutyl alcohol, tert-butyl alcohol, nitromethane, etc.

Non-limiting examples of a co-culture of microbes include members of *Pseudonocardia* and related genera and *Dehalococcoides* and related genera. Genera of aerobic bacteria related to *Pseudonocardia* that can degrade HVOC stabilizers and some HVOCs include without limitation *Mycobacterium, Rhodococcus, Nocardioides, Methylosinus, Methylococcus, Methylobacterium,* and *Polaromonas*. Genera of anaerobic bacteria related to *Dehalococcoides* that can degrade HVOCs include without limitation *Desulfitobacterium, Dehalobacter, Dehalogenimonas, Dehalospirillum, Desulfuromonas, Geobacter, Clostridium,* and *Enterobacter*. Cultures containing *Dehalococcoides sp.* can be purchased from a commercial supplier such as SiREM (Canada) under the trade name KB-1®. *Pseudonocardia dioxanivorans* CB1190 (CB1190) (ATCC Accession No. 55486, DSMZ Accession No. 44775) can be grown from a pure culture incubated at 25 to 35° C. under agitation in the same defined media as the Dehalococcoides sp. Microcosms of the microbes can be prepared under sterile anaerobic conditions. In some embodiments, the co-culture can include an engineered microbial community composed of any anaerobic microorganism (e.g. KB-1) and any aerobic microorganism (e.g. *Pseudonocardia dioxanivorans* CB1190 (CB1190), and the like) bacteria in modified medium to simultaneously or sequentially degrade HVOCs and HVOC stabilizing compounds. The media contains: 2.25 g/L of $NaCO_3$, 10 mL/L of 100× salt stock solution (100× stock solution: 100 g/L NaCl, 30 g/L $NH_4Cl$, 30 g/L KCl, 20 g/L $KH_2PO_4$, 50 g/L $MgCl_2$-$6H_2O$ 1.5 $CaCl_2$-$2H_2O$), 1 mL/L of the Trace Element Solution A (Trace Element Solution A: 10 g/L HCl (25% w/w), 0.006 g/L $H_3BO_3$, 0.5 NaOH, 0.1 g/L $MnCl_2$-$4H_2O$, 1.5 g/L $FeCl_2$-$4H_2O$, 0.19 g/L $CoCl_2$-$6H_2O$, 0.07 g/L $ZnCl_2$, 0.002 g/L $CuCl_2$-$2H_2O$, 0.024 g/L $NiCl_2$-$6H_2O$, 0.036 g/L $NaMoO_4$-$6H_2O$), and 1 mL/L of Trace Element Solution B (Trace Element Solution B: 0.006 g/L $Na_2SeO_4$-$5H_2O$ and 0.008 g/L $Na_2WO_4$-$5H_2O$). After the above ingredients are added, the media's pH is adjusted to 7.2-7.3 and is then autoclaved for 30 minutes at 121° C. After the media is added to sterile serum bottles, it is sparged for 3 minutes with filtered $N_2$ gas to achieve anaerobic conditions. Bottles are sealed with a 20 mm butyl rubber stopper. The mixture (co-culture) of microorganisms can be in a weight ratio of $1:10^{12}$, $1:10^{11}$, $1:10^{10}$, $1:10^9$, $1:10^8$, $1:10^7$, $1:10^6$, $1:10^5$, $1:10^4$, 1:1000, 1:100, 1:75; 1:50, 1:25, 1:20, 1:10, 1:1, 10:1, 20:1, 25:1, 50:1, 75:1 100:1, 1000:1, $10^4$:1, $10^5$:1, $10^6$:1, $10^7$:1, $10^8$:1, $10^9$:1, $10^{10}$:1, $10^{11}$:1, $10^{12}$:1, or between any two of these values. Appropriate ratios can be determined based on cultures and site-specific biogeochemical conditions.

The bioremediation process may be performed either in-situ or ex-situ to remove contaminants from various environments including aqueous systems. Aqueous systems suitable for treatment include drinking water, groundwater, industrial waste water and the like. By way of example, the microbial mixture can be added to the contaminated substance. FIG. 1 depicts a schematic of the microbial mixture degradation process 100. A microbial mixture can be contacted with contaminated substance 102 in subsurface formation 104. The microbial mixture can include HVOC stabilizer-degrading microorganisms 106 and HVOC-degrading microorganisms 108. In some embodiments, the microbial mixture can be injected into contaminated substance 102 using an injection well, pump, or other known equipment (not shown) for providing microorganisms to a subsurface formation. Contaminated substance 102 can include soil and/or groundwater. As shown, contaminated substance 102 is groundwater and can include stabilizers (e.g., 1,4-dioxane) and/or HVOCs (e.g., TCE). The environment at the portion 110 of contaminated substance (e.g., a contaminated plume of water) is primarily anaerobic. In the anaerobic environment, HVOC-degrading microorganisms can degrade halogenated VOCs (HVOCs) by replacing a halogen (e.g. chlorine atom) in the VOC with a hydrogen through enzymatic activity. By way of example, TCE can be degraded to cis-dichloroethylene and further to vinyl chloride. Without wishing to be bound by theory, the HVOC-degrading microorganism 108 can reduce the amount of halogen (e.g. chlorine) in the HVOC by reductive transference of a hydrogen atom with a halogen atom to generate the lower molecular weight HVOCs (e.g., cis-dichloroethylene and vinyl chloride). As the microbial mixture and TCE degradation products migrate through subsurface formation 104 (e.g., through the plume) to primarily aerobic portion 112 of contaminated substance 102, HVOC stabilizing compounds and smaller molecular weight HVOCs can enzymatically degraded by HVOC stabilizer-degrading microorganism 106. The HVOC stabilizer-degrading aerobic microorganisms (e.g., CB1190) can withstand anaerobic incubation and reactivate the monooxygenase enzyme necessary to biodegrade stabilizers, HVOCs, VOCs and by products of HVOC degradation (e.g., TCE to cDCE and vinyl chloride). For example, 1,4-dioxane and cDCE can be degraded to $H_2O$, $CO_2$, $Cl^-$, and $H^+$. The stabilizer contaminants can be biodegraded at a rate of at least 500 μg $L^{-1}$ day$^-$, at least 1000 μg $L^{-1}$ day$^{-1}$, at least 1500 μg $L^{-1}$ day$^{-1}$, at least 2000 μg $L^{-1}$ day$^{-1}$, at least 2500 μg $L^{-1}$ day$^{-1}$, at least 3000 μg $L^{-1}$ day$^{-1}$, at least 3500 μg $L^{-1}$ day$^{-1}$, at least 4000 μg $L^{-1}$ day$^{-1}$, at least 4500 μg $L^{-1}$ day$^{-1}$, at least 5000 μg $L^{-1}$ day$^{-1}$, at least 5500 μg $L^{-1}$ day$^{-1}$, at least 6000 μg $L^{-1}$ day$^{-1}$, at least 6500 μg $L^{-1}$ day$^{-1}$, at least 7000 μg $L^{-1}$ day$^{-1}$, at least 7500 μg $L^{-1}$ day$^{-1}$, at least 8000 μg day$^{-1}$, at least 85000 μg day$^{-1}$, at least 9000 μg day$^{-1}$, at least 10,000 μg $L^{-1}$ day$^{-1}$ or until all of the stabilizer contaminants are less than 1 ppm. The HVOC contaminants are degraded at a rate of at least 100 μg $L^{-1}$ day$^{-1}$, at least 500 μg $L^{-1}$ day$^{-1}$, at least 600 μg $L^{-1}$ day$^{-1}$, at least 700 μg $L^{-1}$ day$^{-1}$, at least 800 μg $L^{-1}$ day$^{-1}$, at least 900 μg $L^{-1}$ day$^{-1}$, at least 1000 μg $L^{-1}$ day$^{-1}$, at least 1500 μg $L^{-1}$ day$^{-1}$, at least 2000 μg $L^{-1}$ day$^{-1}$, or at least 2500 μg $L^{-1}$ day$^{-1}$.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Materials and Methods

Chemicals. 1,4-Dioxane (99.8%, ACS grade), TCE (≥99.5%, ACS grade), cDCE (97%), sodium lactate (60% w/w), and titanium trichloride ($TiCl_3$, ≥99.9%), were obtained from Sigma-Aldrich® (U.S.A). Saturated chlorinated stock solutions were prepared in accordance with previous methods of Alvarez-Cohen et al. (*Applied and Environmental Microbiology*, 1991, 57:228-35)

Bacterial Cultures and Growth Conditions. The mixed culture KB-1®, containing mostly *Dehalococcoides sp.*, was grown in 160 mL bottles in a defined medium with $N_2$, headspace, 1 mg/L TCE as electron acceptor, and 0.9 g/L lactate as carbon source. CB1190 stock cultures were prepared using a 1% (v/v) transfer from an actively growing, pure culture that was incubated at 30° C. at 150 rpm to maintain aerobic conditions in the same defined media as KB-1®. Cultures were used to inoculate experimental bottles once stock cultures achieved late exponential or early stationary phase and biodegraded TCE or 1,4-dioxane to below <1.0 mg per L. $TiCl_3$ was amended to reduce any trace amounts of oxygen in anaerobic cultures.

Batch Reactor Design. Microcosms were either prepared in sterile 160 mL or 500 mL anaerobic glass bottles fitted with anaerobic butyl rubber stoppers (Chemglass, Vineland, N.J.). All bottles were amended with a 1:5 ratio of media to headspace. The microcosms were developed with the following conditions: 1) CB1190+KB-1® that transitioned from anaerobic to aerobic ("anaerobic/aerobic") 2) CB1190 only that transitioned from anaerobic to aerobic conditions, and 3) CB1190 only that remained anaerobic. Once the TCE was degraded to cDCE by KB-1® filtered, high purity oxygen was amended to specified microcosms, CB1190 only anaerobic/aerobic and CB1190+KB-1® anaerobic/aerobic until bottles achieved atmospheric conditions. Experimental bottles according to their condition were inoculated with 10% (v/v) CB1190 and 5% (v/v) KB-1®. Microcosms were incubated at 30° C. with 150 rpm. At each time point, 200 μL of liquid sample was collected and filtered for 1,4-dioxane quantification. High 1,4-dioxane and TCE concentration (hereafter "high concentration") bottles were inoculated with 1,4-dioxane (17 mg/L) and TCE (5 mg/L). Low 1,4-dioxane and TCE concentration bottles (hereafter "low concentration") were inoculated with 1,4-dioxane (3 mg/L) and TCE (1.3 mg/L). The detection limit for chlorinated ethenes and 1,4-dioxane was 1 μg/L and 20 μg/L, respectively.

Analytical Methods. Chloroethenes were measured by mass spectrometry (MS system 5973)-gas chromatography (GC system 6890) using 10 or 100 μL headspace samples. Greater than (>) 1 mg/L dioxane concentrations were measured by flame ionize detector-gas chromatography (GC system 6890) using 2 μL liquid samples and less than (<) 1 mg/L dioxane concentrations were measured by mass spectrometry-gas chromatography using 2μL liquid samples that were extracted from cultures using a frozen micro-extraction technique of Li et al., (*Ground water monitoring & Remediation*, 2011, 31:70-6). The mass of each compound was calculated based on Henry's law (dimensionless constant at 30° C. for: TCE=0.523 and cDCE=0.202) regarding gas-liquid equilibrium constants at 30° C. Dissolved oxygen and pH were measured using an Orion 5-Star Plus multi-parameter meter (Thermo Scientific, Waltham, Mass.) and were measured in the anaerobic and aerobic incubation conditions. The dissolved oxygen probe was calibrated using air saturated water (high oxygen concentrations) and a 50 g/L, sodium sulfite solution for the set zero (low oxygen concentrations).

Total Nucleic Acids Extraction and cDNA Synthesis. Total nucleic acids were extracted from cell pellets using a phenol-chloroform extraction method. Liquid samples (500 μL) were collected during incubation for cell density measurements and cells were harvested via centrifugation (21, 000×g, 10 min at 4° C.) and the supernatant was discarded. Cells were lysed by adding 250 μL of lysis buffer (50 mM sodium acetate, 10 mM EDTA [pH 5.1]), 100 μL 10% sodium dodecyl sulfate, 1.0 mL pH 8.0 buffer-equilibrated phenol, and 1 g of 100 μm-diameter zirconiasilica beads (Biospec Products, Bartlesville, OK), followed by heating at 65° C. for 2 min, bead beating for 2 min with a Mini-Beadbeater 16 (Biospec Products, Bartlesville, OK), incubating for 8 min at 65° C., and bead beating again for 2 min. The lysate was collected by centrifugation at 13000 g for 5 min, followed by phenol-chloroform-isoamyl alcohol purification (1 volume) and chloroform-isoamyl alcohol purification (1 volume). Precipitation of total nucleic acids was performed by the addition of 3 M sodium acetate (0.1 volume) and isopropanol 91 volume) followed by incubation at −20° C. overnight. Nucleic acid pellets were collected sample holds at 50° C. for 2 min and 95° C. for 10 min, followed by 40 cycles of 95° C. for 15 s and 60° C. for 45 s. All reactions were accompanied by a melt curve analysis to confirm the specificity of qPCR products. Melt-curve analyses that were within the ranges of 78.1-80.5° C. (rpoD) and 81.5-83.6° C. (dxmB, aldH, and 16S rRNA) were considered specific to each target gene.

TABLE 1

| Primers | Sequence | Reference |
| --- | --- | --- |
| CB1190 16S rRNA for | 5'-ACGGTCTCGCAGCCCTCTGT-3' | Zhang et al, |
| CB1190 16S rRNA rev | 5'-AGCGGGTTATGCCGGGGACT-3' | 2016 |
| tceA for | 5'-TAATATATGCCGCCACGAATGG-3' | Waller et al, |
| tceA rev | 5'-AATCGTATACCAAGGCCCGAGG-3' | 2005 |
| rpoD for | 5'-GGGCGAAGAAGGAAATGGTC-3' | Grostern et al, |
| rpoD rev | 5'-TCATTAACGGCAGCAAACGC-3' | 2012 |
| dxmB for | 5'-CCAAACGGGCGTCAGTCAT-3' | Gedalanga et al, |
| dxmB rev | 5'-AGAACGTGCGCTCCCAAAG-3' | 2014 |
| aldH for | 5'-GCCGACGCTTTTAGCAGATG-3' | Gedalanga et al, |
| aldH rev | 5'-TCATTAACGGCAGCAAACGC-3' | 2014 | by centrifugation at 4° C. for 30 min at 20000 g. The precipitate was washed with 70% ethanol and resuspended in 100 µL of DNase- and RNase-free water. The purity of DNA and RNA were determined by a Nanodrop 2000C spectrophotometer (Thermo Scientific, Wilmington, DE). For gene expression analyses, RNA was isolated from total nucleic acid extracts using a RapidOUT DNase Kit (Thermo Scientific, Waltham, MA). The cDNA was synthesized from purified total RNA using a Maxima First Strand cDNA Synthesis Kit (Thermo Scientific, Waltham, MA). All samples were stored at −80° C. until further amplification and analyses.

Quantitative Polymerase Chain Reaction. The effect of anaerobic incubation on CB1190's gene expression in pure and mixed cultures was determined by measuring CB1190's 1,4-dioxane biomarker targets (dxmB and aldH). These biomarker targets were monitored because of their relevance to the 1,4-dioxane biodegradation pathway such as the monooxygenase and dehydrogenase enzymes. CB1190's cellular growth over time was measured using the 16S rRNA gene. Gene expression was quantified using the $2^{-\Delta\Delta C_T}$ method as described by Livak and Schmittgen (*Methods*, 2001;25(4):402-8). Gene expression data were first normalized to the housekeeping gene, RNA polymerase σ subunit D (rpoD), followed by normalization to the values obtained at the end of the anaerobic incubation period. Quantitative Polymerase Chain Reaction (qPCR) using the SYBR-green based detection reagents were utilized to quantify gene copy numbers of CB1190 and KB-1 as well as gene expression of CB1190. Primer sequences used for amplification of genes by qPCR are listed in Table 1 (CB1190 16S rRNA forward/reverse primer SEQ ID NO:½; tceA forward/reverse primer SEQ ID NO:¾; rpoD forward/reverse primers SEQ ID NO:⅚; dxmB forward/reverse primer SEQ ID NO:⅞; and aldH forward/reverse primers SEQ ID NO:9/10). All reactions were run on a StepOnePlus thermocycler (Life Technologies, Carlsbad, CA) using a total volume of 20 µL containing 1× Luminaris Color HiGreen-HiROX qPCR Master Mix (Thermo Scientific, Waltham, MA), 0.3 mM primers, and 2.5 µL of DNA (1-10 ng/µL) template. The cycling parameters to amplify the gene fragment included Live/Dead Viability Assay. Post anaerobic incubation, 20 µL cell culture samples were collected and fixed to a glass slide. Bacteria were stained using the LIVE/DEAD BacLight Bacterial Viability Kit L13152 (Invitrogen, Molecular Probes, Inc. Eugene, OR, USA) for 15 minutes to determine the proportion of live/dead cells. The kit deciphers live/dead cells based on their cell membrane. Samples were then rinsed with sterilized deionized water and fixed with a 1 mm glass cover slip. The SYTO 9 and propidium iodide solution was prepared by dissolving the contents of component A or B of the kit in 30 mL of sterile, deionized water. Bacterial cells with intact cell membranes display green fluorescence whereas dead or damaged bacterial cells display red fluorescence. Samples were imaged using a 4× CCD camera (Axiocam MRm System) attached to a Zeiss Axioskop 2 microscope with a 40× objective, fluorescent lamp, and a blue excitation filter. During observation, the images were taken at an excitation range of 450-490 nm. Fluorescent images were analyzed using ImageJ software.

Statistical Analysis. All experiments were performed in biological triplicates and presented as the means±standard deviations. 1,4-dioxane and CVOC inter and intragroup differences were estimated using a paired two sample for means t-Test. Intragroup biomass differences were estimated using a one-way paired t-Test. Values were considered statistically significant when the p value was <0.05.

Example 1

(1,4-Dioxane and Chlorinated Volatile Organic Compounds Before and After Anaerobic Incubation)

TCE was biodegraded to cDCE in the CB1190+KB-1® anaerobic/aerobic bottles. After degradation, high purity oxygen was added to the CB1190+KB-1® anaerobic/aerobic and CB1190 anaerobic/aerobic bottles to achieve atmospheric conditions. High concentration bottles remained anaerobic for 48 hours and low concentration bottles remained anaerobic for 16 hours. Vinyl chloride was also monitored and remained below 1 µg/L. Oxygen amendments ceased KB-1® activity. This was believed to be due to the oxidative stress on the enzymes that made up their alternative respiratory chain, as well as the production of partially reduced reactive species such as superoxide radicals and hydrogen peroxide. After the transition to aerobic conditions, CB1190 experienced a lag phase and then began to biodegrade 1,4-dioxane as well as cDCE.

Figure 2:
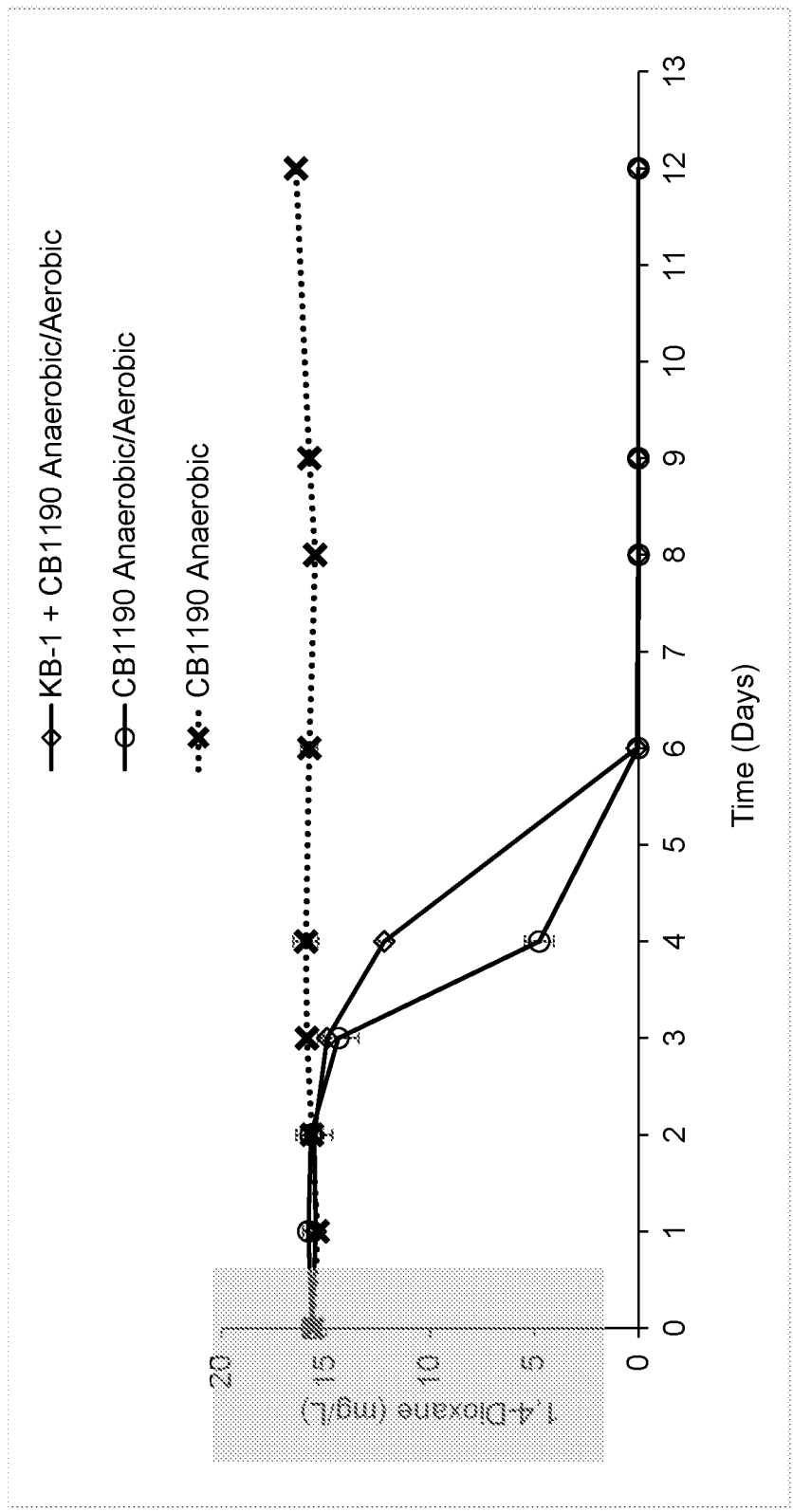
FIG. 2 shows biodegradation of high concentrations of 1,4-dioxane by CB1190 in pure and mixed cultures of the present invention.
Figure 3:
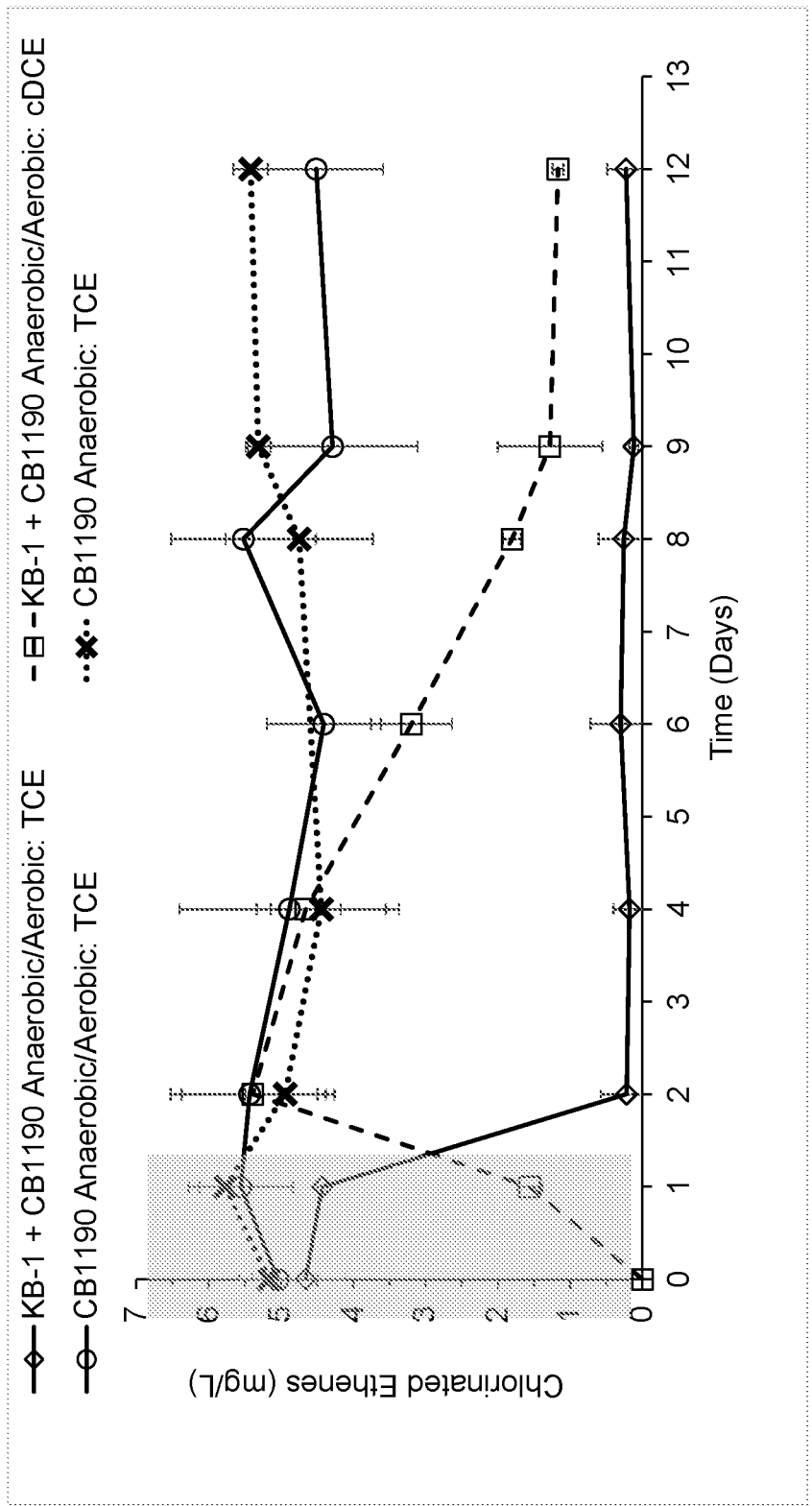
FIG. 3 shows biodegradation of high concentrations of TCE by KB-1® and cDCE biodegradation by CB1190 in pure and mixed cultures of the present invention.
Figure 4:
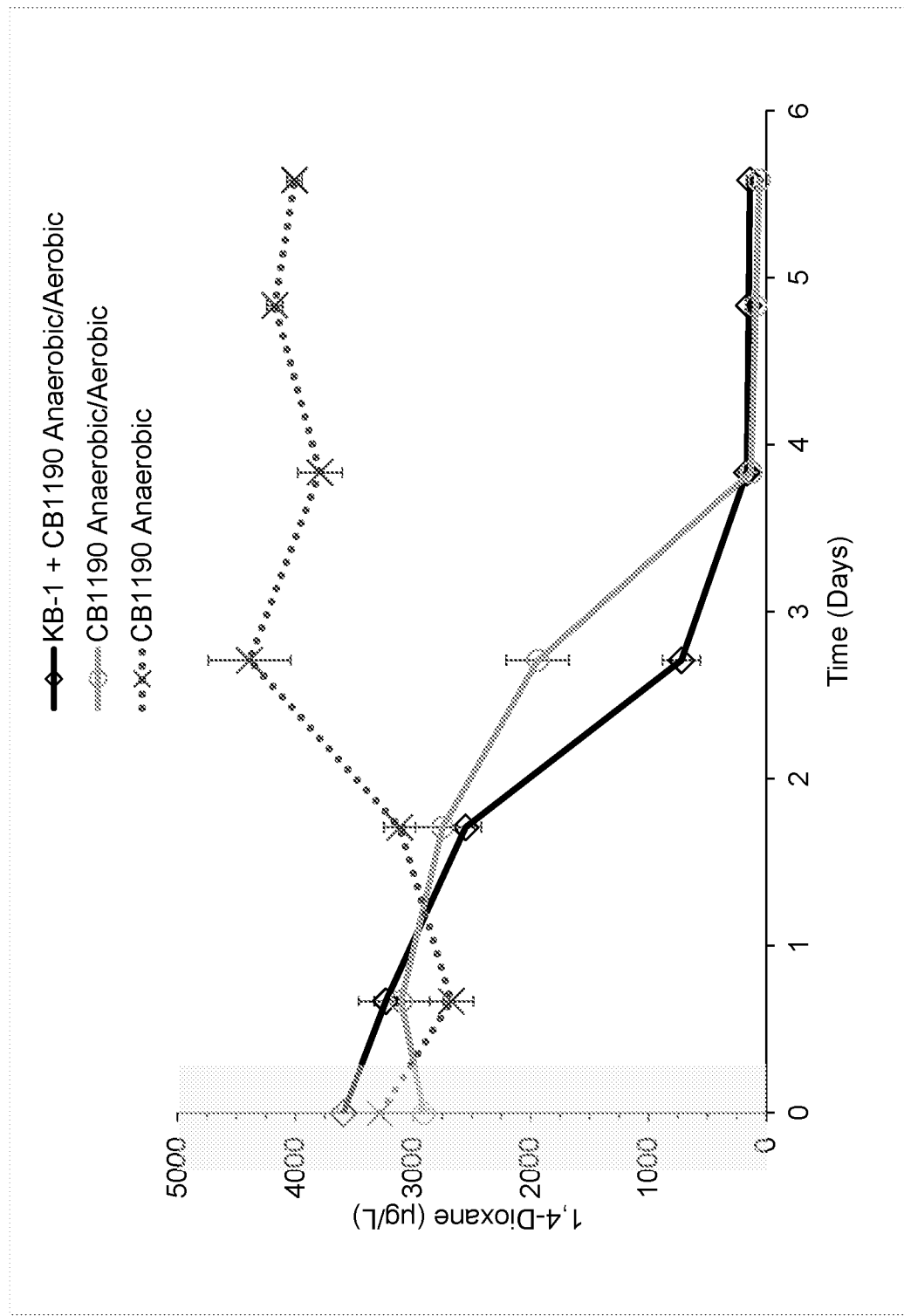
FIG. 4 shows biodegradation of low concentrations of 1,4-dioxane by CB1190 in pure and mixed cultures of the present invention.
Figure 5:
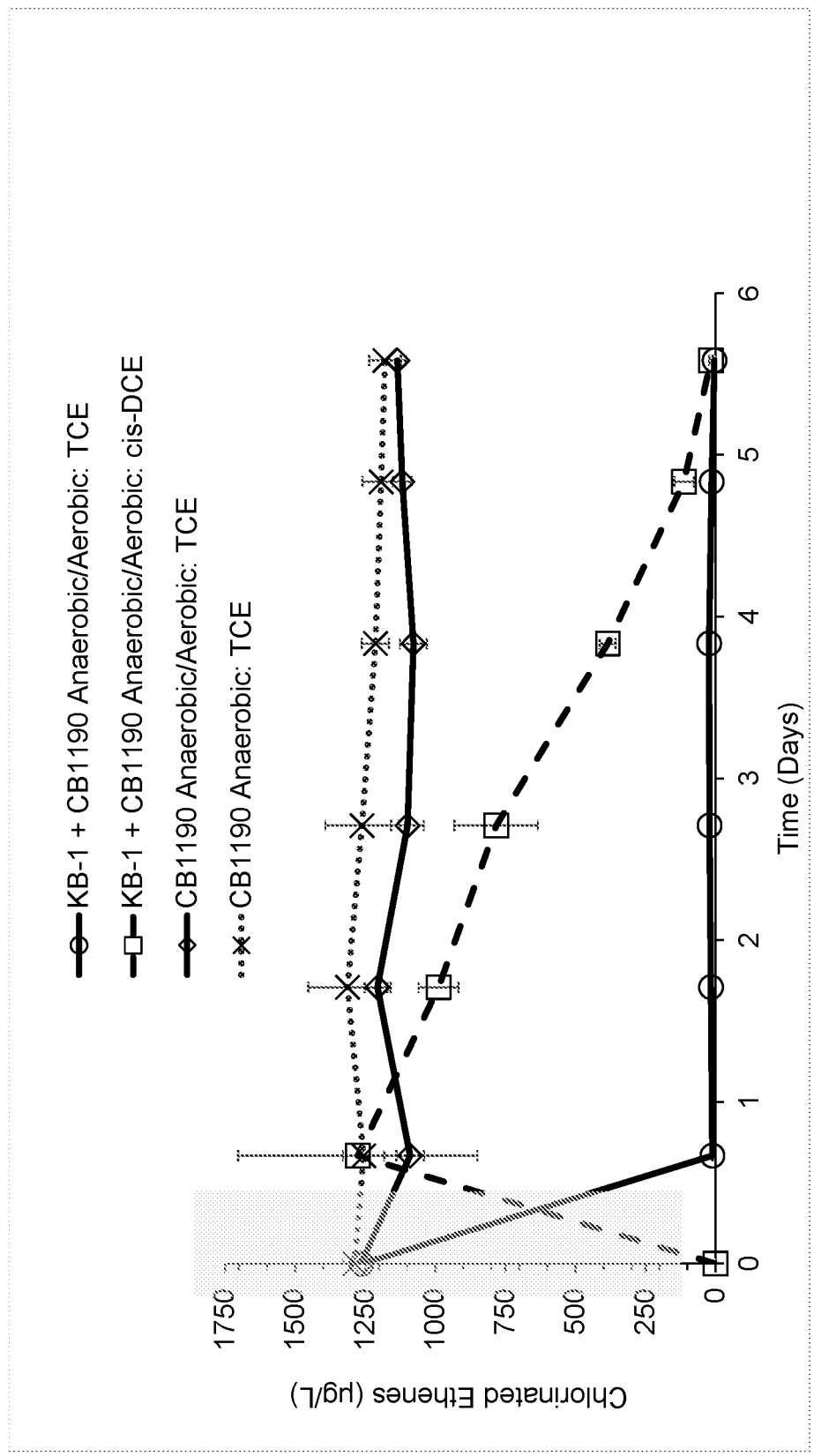
FIG. 5 shows biodegradation of low concentrations of TCE by KB-1® and cDCE biodegradation by CB1190 in pure and mixed cultures of the present invention.
Figure 8:
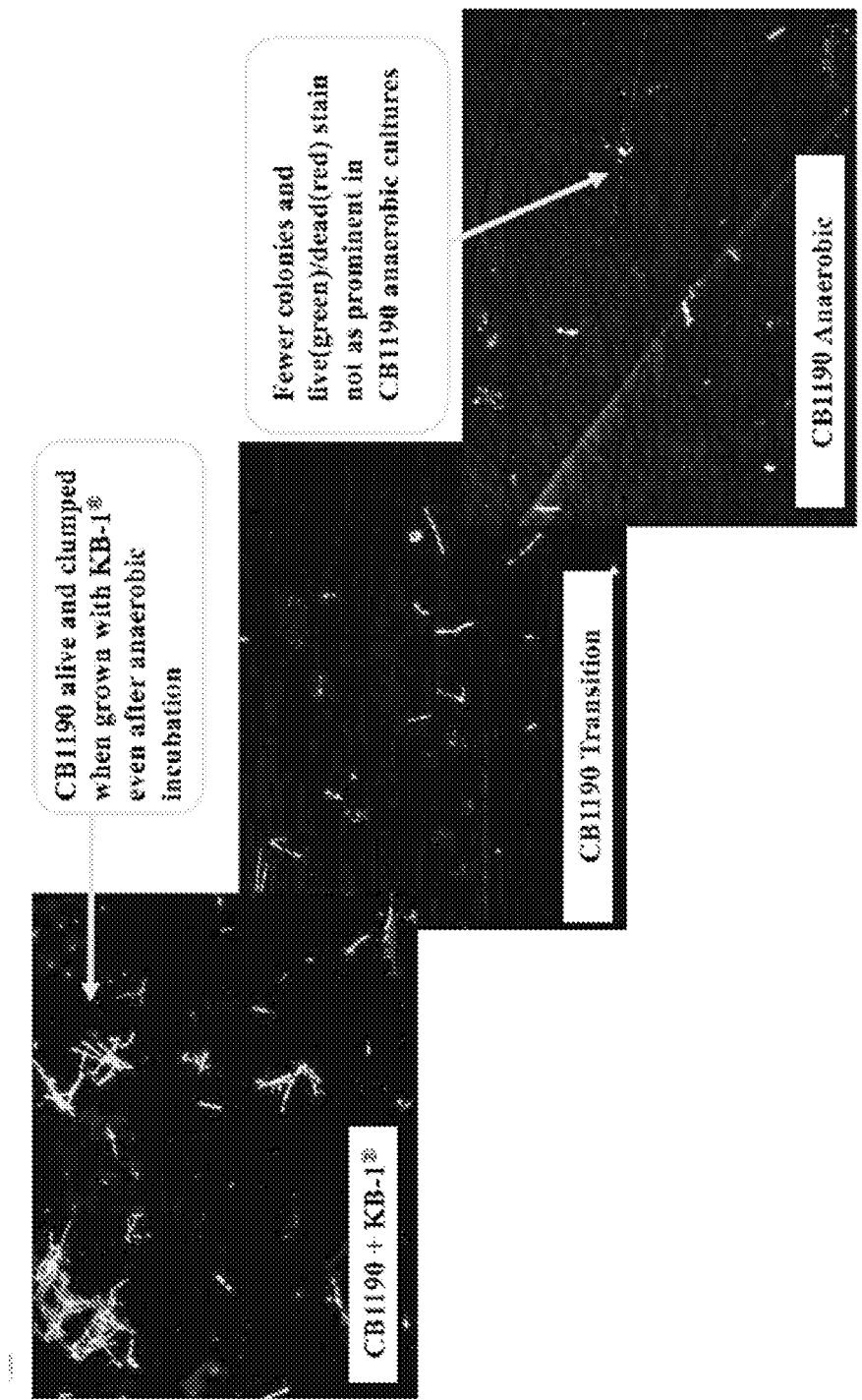
FIG. 8 shows live/dead microscopy image of low concentration bottles. From left to right: CB1190+KB-1® anaerobic/aerobic, CB1190 anaerobic/aerobic, and CB1190 anaerobic.
Figure 9:
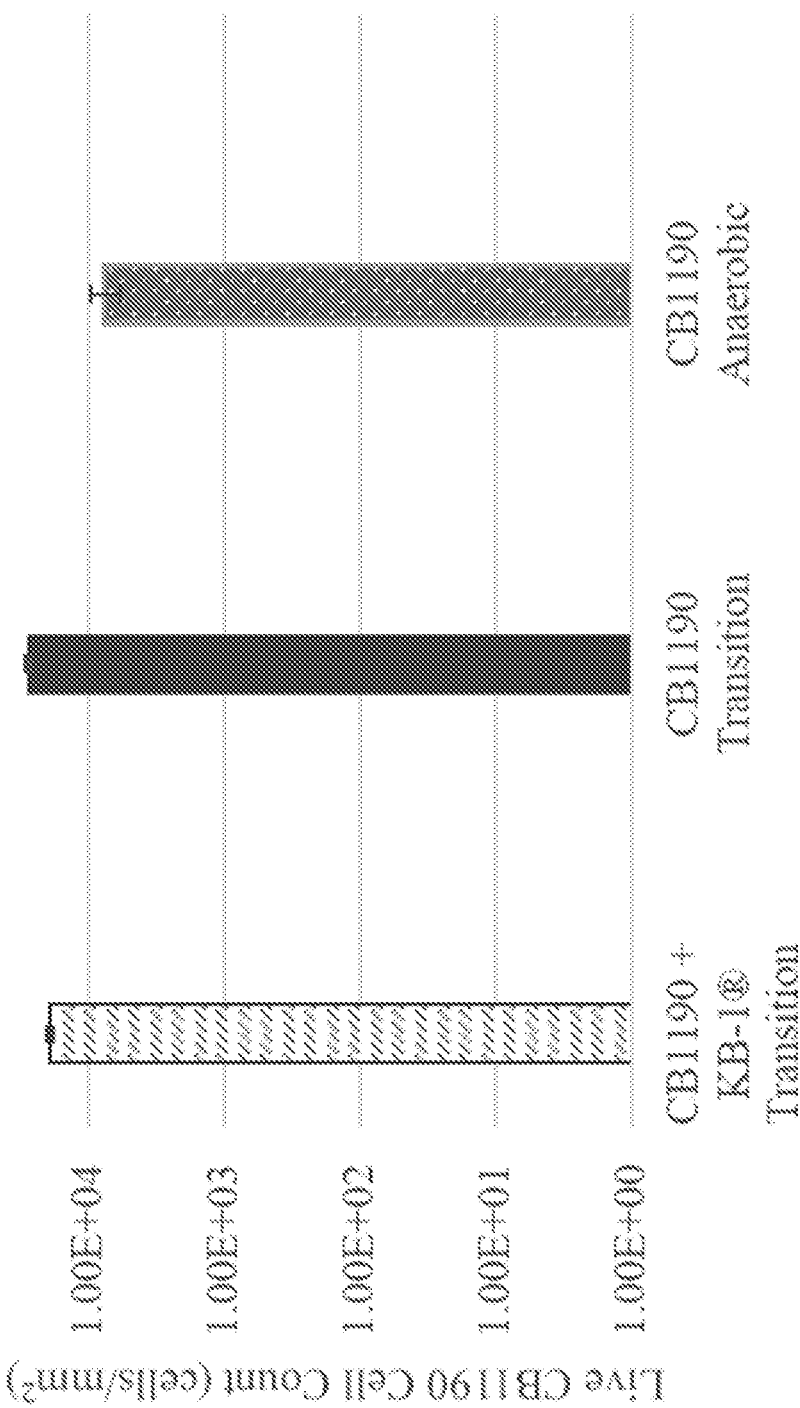
FIG. 9 shows live cell count of CB1190 in low TCE and 1,4-dioxane concentration bottles after an anaerobic phase.

Table 2 lists the biodegradation rates of cDCE, and 1,4-dioxane in mixed and pure cultures containing CB1190 after transition to aerobic atmosphere (if applicable). The high concentration bottles with KB-1®+CB1190 anaerobic/aerobic degraded 1,4-dioxane at a rate of 3,868±187 µg/L/day (See, FIG. 2) and cDCE at a rate of 423±94 µg/L/day (FIG. 3), and the CB1190 anaerobic/aerobic bottles degraded 1,4-dioxane at a rate of 3,923±152 µg/L/day (FIG. 2). The low concentration bottles with KB-1®+CB1190 anaerobic/aerobic degraded 1,4-dioxane at a rate of 630±20 µg/L/day (See, FIG. 4) and cDCE at a rate of 260±90 µg/L/day (See, FIG. 5), and the CB1190 anaerobic/aerobic bottles degraded 1,4-dioxane at a rate of 620±70 µg/L/day (See, FIG. 4). The CB1190 anaerobic/aerobic bottles and CB1190 anaerobic bottles did not show significant TCE biodegradation in both the high and low concentration (See, FIGS. 3 and 5). During the anaerobic phase, TCE degradation rate for 5000 µg/L initial TCE was 2221+/−103 µg/L/day. For 1300 µg/L initial TCE, the rate was 1869+/−54 µg/L/day.

anaerobic bottles (p value<0.05) (FIG. 8). The CB1190 anaerobic/aerobic bottles (FIG. 8) had 3.5 times more live cells than the CB1190 anaerobic bottles (p value<0.05) (FIG. 8). FIG. 9 shows the live cell count of these images.

Table 3 shows the comparison of the biodegradation rates of 1,4-dioxane by CB1190 and *Shewanella oneidensis* post anaerobic incubation, which is a free radical-mediated degradation. Without wishing to be bound by theory, it is believed that embodiments disclosed herein rely on the TCE-RDase enzyme in *Dehalococcoides* to degrade the TCE by removing a chlorine and replacing it with a hydrogen, and the monooxygenase enzyme in CB1190 to break down the carbon oxygen bond in the 1,4-dioxane. The results demonstrated that even when CB1190 was provided with high or low concentrations of TCE and 1,4-dioxane, and had been exposed to anaerobic conditions for an extended period followed by aerobic incubation, it was able to significantly increase its biomass (See, FIGS. 6 and 7). These results demonstrate the survivability of the microbial consortium and potential to be used in diverse contaminated groundwater sites.

CB1190's apparent dormancy under oxygen-limited conditions can be explained by its ability to quickly adapt to stressful conditions. Similar aerobic bacteria, *Mycobacterium tuberculosis* and *Mycobacterium bovis*, were grown in microaerophilic and anaerobic conditions. The cells appeared to produce a thickened cell wall to withstand

TABLE 2

| Experimental Conditions | Initial 1,4-Dioxane Conc. (µg/L) | Initial TCE Conc. (µg/L) | 1,4-Dioxane Biodegradation Rate (µg/L/day) | cDCE Biodegradation rate (µg/L/day) |
| --- | --- | --- | --- | --- |
| KB-1 + CB1190 Anaerobic/Aerobic | 15,000 | 5,000 | 3,868 ± 187 | 423 ± 94 |
| CB1190 Anaerobic/Aerobic | 15,000 | 5,000 | 3,923 ± 152 | N/A |
| KB-1 + CB1190 Anaerobic/Aerobic | 3,000 | 1,300 | 630 ± 20 | 260 ± 90 |
| CB1190 Anaerobic/Aerobic | 3,000 | 1,300 | 620 ± 70 | N/A |

Figure 6:
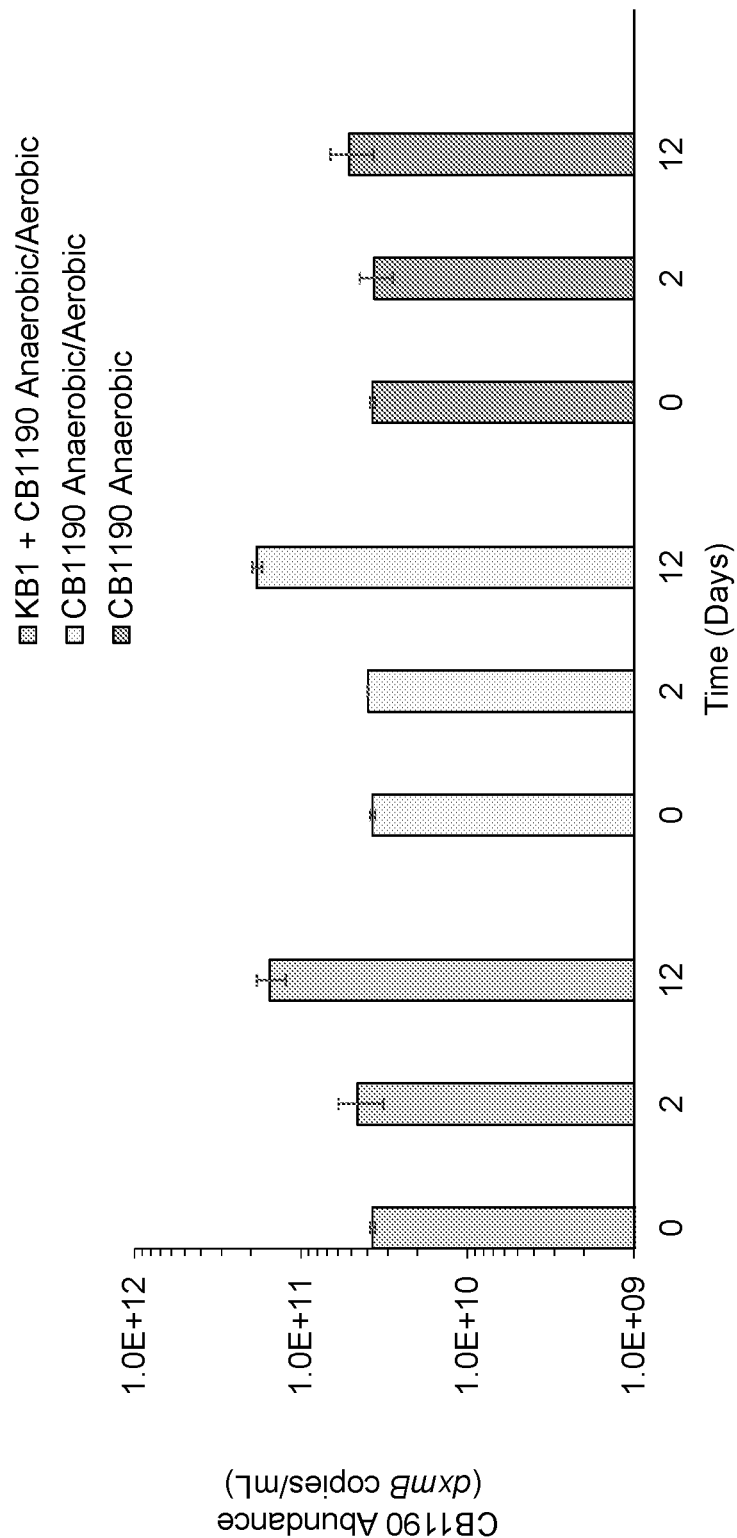
FIG. 6 shows CB1190's growth before and after oxygen amendments in high TCE and 1,4-dioxane concentration bottles (three left-most bars: KB1+CB1190 anaerobic/aerobic; three middle bars: CB1190 anaerobic/aerobic; three right-most bars: CB1190 anaerobic). The dxmB gene was used quantify cell number. CB1190+KB-1® anaerobic/aerobic and CB1190 anaerobic/aerobic had a p value of <0.05.
Figure 7:
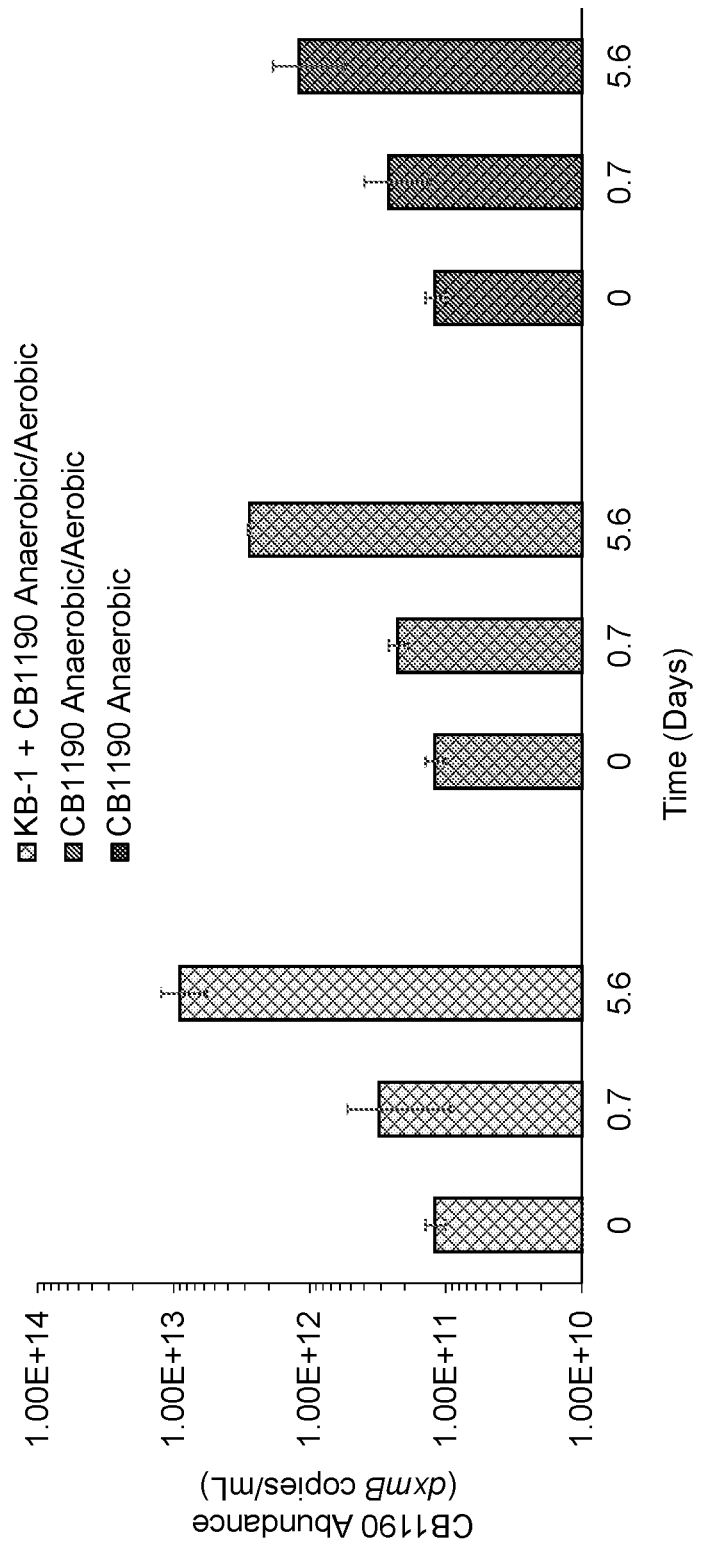
FIG. 7 shows CB1190's growth before and after oxygen amendments in low TCE and 1,4-dioxane concentration bottles (three left-most bars: KB1+CB1190 anaerobic/aerobic; three middle bars: CB1190 anaerobic/aerobic; three right-most bars: CB1190 anaerobic). The dxmB gene was used quantify cell number. CB1190+KB-1g anaerobic/aerobic and CB1190 anaerobic had a p value of <0.05.

In the high concentration bottles, CB1190+KB-1® grew at a rate of 8.16±3.7×10$^9$ dxmB copies/mL/day (See, FIG. 6), and the CB1190 anaerobic/aerobic bottles grew at a rate of 1.27±0.7×10$^{10}$ dxmB copies/mL/day (See, FIG. 6). In the low concentration bottles, CB1190+KB-1® anaerobic/aerobic bottles grew at a rate of 1.56±0.7×10$^{12}$ dxmB copies/mL/day (See, FIG. 7), and the CB1190 anaerobic/aerobic bottles grew at a rate of 5.22±0.02×10$^{11}$ dxmB copies/mL/day (See, FIG. 7). CB1190 anaerobic bottles did not show significant growth (See, FIGS. 6 and 7).

Bacterial Viability Assay. Cell culture samples were collected in the low concentration bottles at 4.8 days. This time point was post anaerobic incubation and 97% of the 1,4-dioxane was biodegraded. CB1190+KB-1® anaerobic/aerobic (FIG. 8) had 2.5 times more live cells than the CB1190 dosage form from a pre-filled syringe, cartridge or filled vial without taking the additional step of reconstituting a powder oxygen deficient conditions in vivo. Specifically, the heat shock protein may play a role in stabilizing the cell structure in the long-term by creating a multi-layer, peptidoglycan protective casing. CB1190 can be exhibiting similar mechanisms to protect itself and reactivate when sufficient oxygen becomes present again. The ability of CB1190 to not only metabolize and grow on 1,4-dioxane, but also, up regulate the enzymes responsible for dioxane and its intermediate products was surprising. Reactivation of the dxmB and aldH (enzymes capable of biodegrading 1,4-dioxane and intermediates) in CB1190 demonstrated that CB1190 could withstand oxygen restrictions in the groundwater.

TABLE 3

| Reference | 1,4-Dioxane Concentration (mg/L) | TCE Concentration (mg/L) | | 1,4-Dioxane Biodegradation Rate (µg/L/day) |
|---|---|---|---|---|
| This Study [1] | 15 | 5 | KB-1 + CB1190 Anaerobic Aerobic | 3,868 ± 187 |
| | | | CB1190 Anaerobic/Aerobic | 3,923 ± 152 |
| This Study [1] | 3 | 1.3 | KB-1 + CB1190 Anaerobic Aerobic | 630 ± 20 |
| | | | CB1190 Anaerobic/Aerobic | 620 ± 70 |
| *Sekar et al., 2016 | 176 | 13 | | 23,000 ± 8,800 (1) |
| | | | | 47,000 ± 7,700 (2) |
| | | | | 58,000 ± 14,000 (3) |
| Sekar et al., 2016 | 176 | N/A | | 65,000 ± 17,000 (1) |
| | | | | 77,000 ± 8,700 (2) |
| | | | | 60,000 ± 7,100 (3) |

*( ) indicates Fenton reaction cycle number. Biodegradation rates increased with cycle number
[1] The TCE concentration in KB-1 + CB1190 bottles represent the initial concentration. Over time, TCE was converted to cDCE.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A method for bioremediation of a contaminated substance, the substance being contaminated with a halogenated volatile organic compound (HVOC) and a HVOC stabilizer compound, the method comprising contacting the contaminated substance under anaerobic conditions with a microbial mixture in an amount sufficient to lower the concentration of the contaminating HVOC and HVOC stabilizer compounds in the contaminated substance, wherein the microbial mixture comprises (a) *Pseudonocardia dioxanivorans* CB1190 and (b) *Dehalococcoides, Desulfitobacterium, Dehalobacter, Dehalogenimonas, Dehalospirillum, Desulfuromonas, Geobacter, Clostridium,* or *Enterobacter* bacteria.

2. The method of claim 1, wherein the contaminated substance is contaminated wastewater, contaminated surface water, or contaminated groundwater in a heterogeneous formation.

3. The method of claim 1, wherein the HVOC stabilizer compound is 1,4-dioxane.

4. The method of claim 1, wherein the HVOC is trichloroethylene (TCE), cis-dichloroethylene (cDCE), vinyl chloride, or combinations thereof.

5. The method of claim 1, wherein the HVOC stabilizer contaminant is degraded at a rate of at least 500 µg/L/day and the HVOC contaminant is degraded at a rate of at least 100 µg/L/day.

6. The method of claim 1, wherein the contaminated substance periodically transitions between aerobic and anaerobic conditions.

7. The method of claim 1, wherein the microbial mixture comprises *Dehalococcoides* bacteria.

8. The method of claim 2, wherein the contaminated substance is contaminated groundwater.

9. A microbial mixture comprising (a) *Pseudonocardia dioxanivorans* CB1190 and (b) *Dehalococcoides, Desulfitobacterium, Dehalobacter, Dehalogenimonas, Dehalospirillum, Desulfuromonas, Geobacter, Clostridium,* or *Enterobacter* bacteria.

10. The microbial mixture of claim 9, wherein the microbial mixture comprises *Pseudonocardia dioxanivorans* CB1190 and *Dehalococcoides* bacteria.

11. An anaerobic aqueous environment comprising the microbial mixture of claim 9.

12. A method of biodegrading one or more compounds, the method comprising:
   adding an effective amount of a mixture of *Pseudonocardia dioxanivorans* CB1190 and *Dehalococcoides* bacteria to a composition that comprises TCE and 1,4-dioxane and is under anaerobic conditions;
   degrading the TCE to form cDCE by metabolism of the *Dehalococcoides* bacteria under anaerobic conditions;
   degrading the cDCE by metabolism of the *Pseudonocardia dioxanivorans* CB1190 after the composition transitions to aerobic conditions; and
   degrading the 1,4-dioxane by metabolism of the *Pseudonocardia dioxanivorans* CB1190 after the composition transitions to aerobic conditions.

13. The method of claim 12, wherein at least 75% of the TCE is degraded before the transition to aerobic conditions.

14. The method of claim 12, wherein the transition to aerobic conditions takes place at least 16 hours after adding the effective amount of the mixture to the composition.

15. The method of claim 14, wherein the transition to aerobic conditions takes place at least 60 hours after adding the effective amount of the mixture to the composition.

16. The method of claim 12, wherein the transition to aerobic conditions occurs due to a change in location of the mixture within an underground geological feature.

17. A method for bioremediation of a contaminated substance, the substance being contaminated with cis-dichloroethylene (cDCE), the method comprising contacting the contaminated substance with a microbial composition comprising *Pseudonocardia dioxanivorans* CB1190 in an amount sufficient to lower the concentration of cDCE in the contaminated substance.

18. The method of claim 17, wherein the microbial composition is contacted with the contaminated substance under aerobic conditions.

* * * * *